(12) United States Patent
Ichinari et al.

(10) Patent No.: US 6,640,041 B2
(45) Date of Patent: Oct. 28, 2003

(54) DEVICE FOR WINDING OPTICAL FIBER CABLE

(75) Inventors: Masahiro Ichinari, Gyoda (JP); Syuichi Hagiwara, Gyoda (JP)

(73) Assignee: Toyokuni Electric Cable Co., Ltd., Tokyo (JP)

( * ) Notice: Subject to any disclaimer, the term of this patent is extended or adjusted under 35 U.S.C. 154(b) by 105 days.

(21) Appl. No.: 09/989,286

(22) Filed: Nov. 20, 2001

(65) Prior Publication Data

US 2003/0095773 A1 May 22, 2003

(51) Int. Cl.[7] .................................................. G02B 6/00
(52) U.S. Cl. ...................................... 385/136; 242/388.1
(58) Field of Search ............................ 242/388.1, 388.2, 242/388.3, 388.4, 530, 584; 385/136, 137, 135

(56) References Cited

U.S. PATENT DOCUMENTS

| | | | | |
|---|---|---|---|---|
| 4,802,638 A | * | 2/1989 | Burger et al. | 242/388.1 |
| 5,265,822 A | * | 11/1993 | Shober et al. | 242/388.2 |
| 6,065,708 A | * | 5/2000 | Matsubara | 242/388.1 |
| 6,349,893 B1 | * | 2/2002 | Daoud | 242/376 |
| 6,511,009 B1 | * | 1/2003 | Harrison et al. | 242/388.5 |
| 6,535,684 B1 | * | 3/2003 | Kondo et al. | 385/137 |

* cited by examiner

Primary Examiner—Lynn Feild
Assistant Examiner—Thanh-Tam Le
(74) Attorney, Agent, or Firm—Jordan and Hamburg LLP

(57) ABSTRACT

A device for winding an optical fiber cable comprises a case formed in the shape of a box, having an axle hole at a center portion of an upper surface thereof; an insertion hole provided substantially central portion of an upper surface and both of sidewalls so as to insert the optical fiber cable so that it pass through into the case; and a drum further including; a winding drum for winding the optical fiber cable provided rotatably into the case so that the optical fiber cable can be wound with bend in a condition that it is not harmed for the characteristic of the optical fiber cable; a flange one of formed integrally and fixed to an upper part of the winding drum, having a guide part that guides end portions of the optical fiber cable to the winding drum after the optical fiber cable is inserted into the insertion hole of the case; a pair of guide drums one of formed integrally and fixed to an upper part of the flange through the space, capable of inserting the optical fiber cable therein; and a rotation implement inserted rotatably into the axle hole formed inner portion of the guide drums, allowing to rotate from the outside the case, so that can wind easily the remaining line of the optical fiber cable without spoiling the characteristic of the optical fiber cable, produced at the time of wiring and the connected optical cable used when in investigation.

4 Claims, 14 Drawing Sheets

DEVICE FOR WINDING OPTICAL FIBER CABLE

BACKGROUND OF THE INVENTION

The present invention relates to a device for winding the remaining line of the optical fiber cable, which produced at the time of the optical fiber cable is wound and the connected optical fiber cable used when in investigation.

The conventional winding device for the remaining line of the electric wire is composed of a case body in the shape of a box; a hole inserted the electric wire thereinto, formed in the central upper surface and the both-sides wall so as to insert the electric wire such that the electric wire passes through inside the case; and an electric wire winding drum mounted rotatably into the case, formed an electric wire insertion slot at a central part thereof, corresponding with the insertion hole.

When the conventional device winds the remaining line of the optical fiber cable, since the winding part to the perimeter part of an electric wire winding drum is bent by the acute angle from the electric wire insertion slot of the electric wire winding drum, the characteristic of the optical fiber cable is spoiled and there is a fault that it could not be used.

SUMMARY OF THE INVENTION

Accordingly, it is an object of the present invention to provide the device for winding an optical fiber cable which can wind easily the remaining line of the optical fiber cable without spoiling the characteristic of the optical fiber cable, produced at the time of wiring and the connected optical cable used when in investigation.

The novel features which are believed to be characteristic of the invention, both as to its organization and method of operation, together with further objects and advantages thereof, are described below with reference to the accompanying drawings in which a presently preferred embodiment of the invention is illustrated as an example.

It is to be expressly understood, however, that the drawings are for the purpose of illustration and description only, and are not intended as a definition of the limits of the invention.

DETAILED DESCRIPTION OF THE PREFERRED EMBODIMENTS

Figure 1:
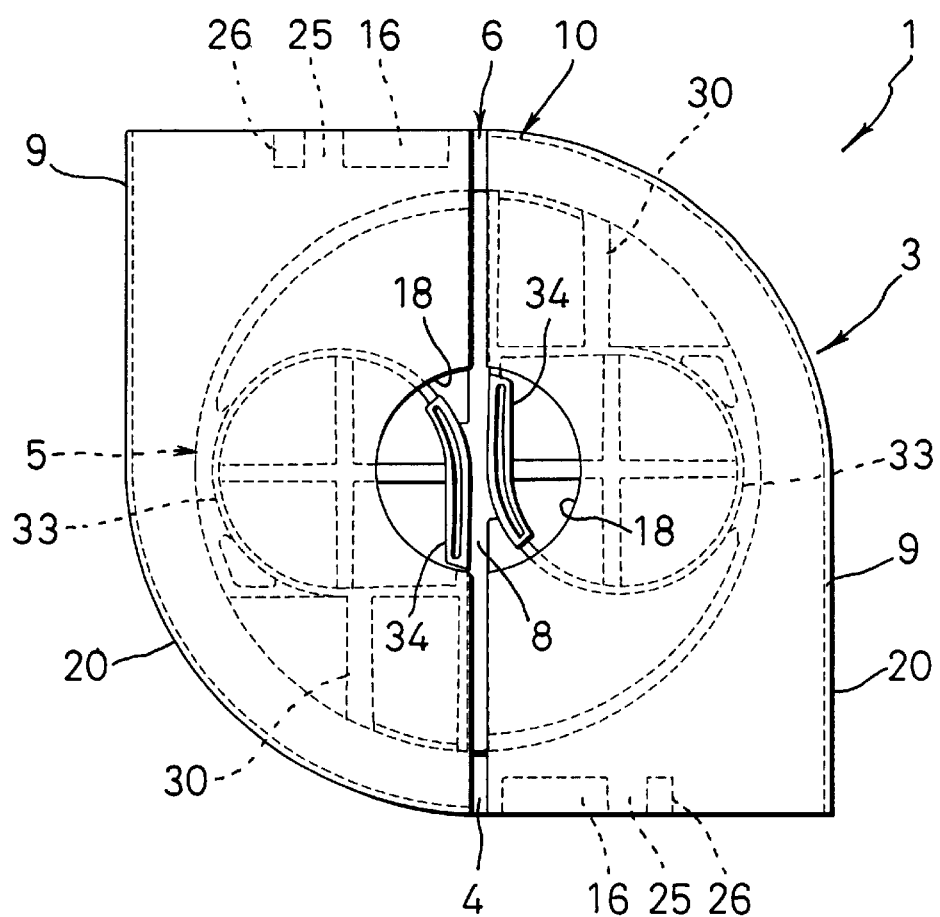
FIG. 1 is a top view showing a first embodiment of the present invention.
Figure 2:
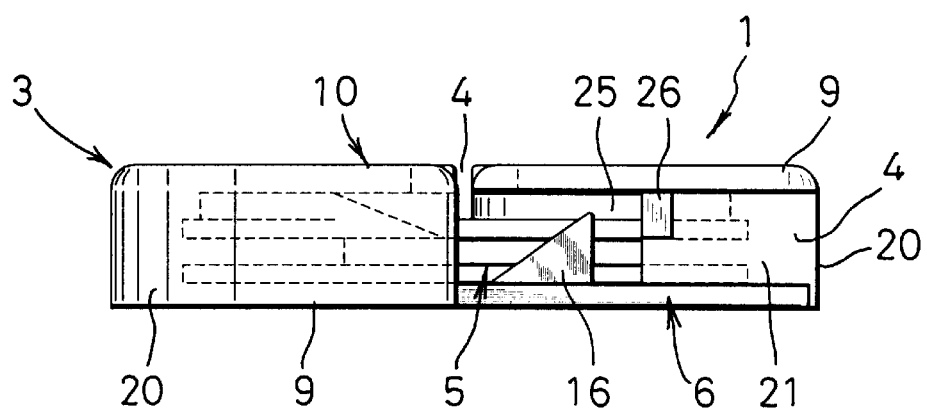
FIG. 2 is a front view showing the first embodiment of the present invention.
Figure 3:
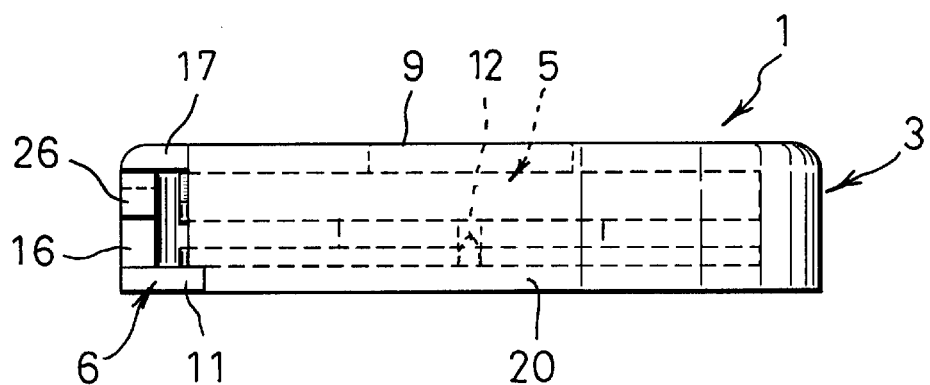
FIG. 3 is a side view showing the first embodiment of the present invention.
Figure 4:
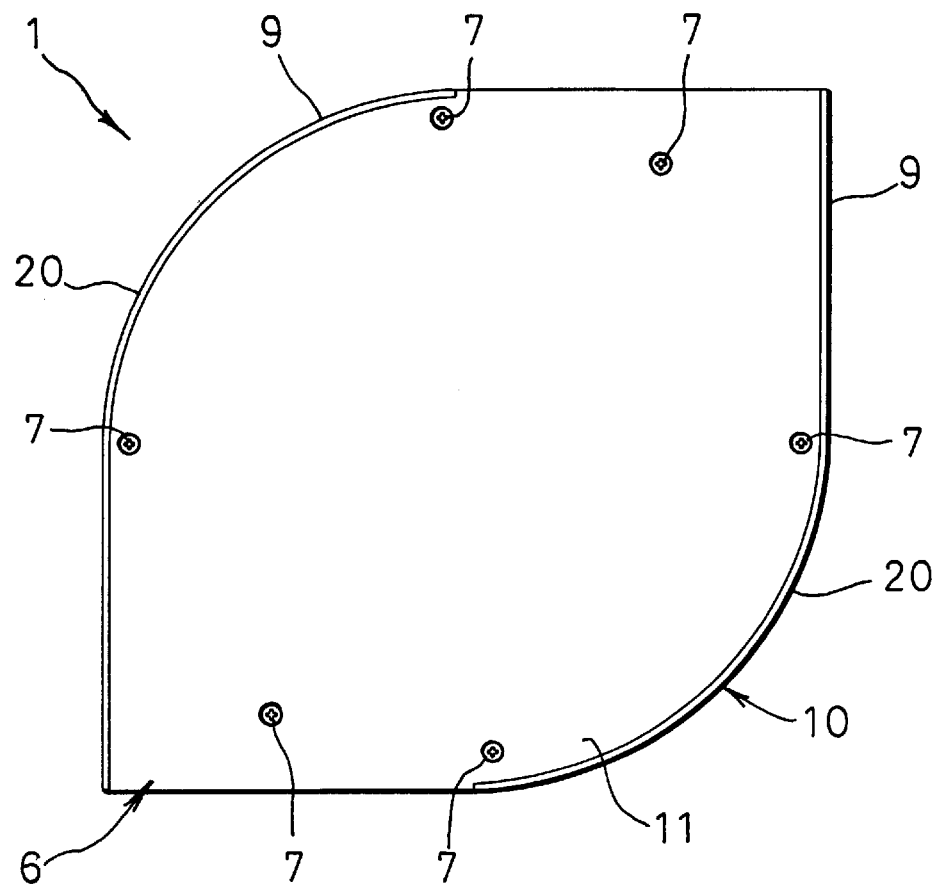
FIG. 4 is a bottom view showing the first embodiment of the present invention.

Preferred embodiments of the present invention are described in more detail below referring to the accompanying drawings.

An understanding of the present invention may be best gained by reference FIGS. 1 to 21. FIGS. 1 to 21 illustrate a winding device of a first embodiment of the present invention.

A winding device 1 of the present invention winds the remaining line of a wired optical fiber cable when the optical fiber cable is wired and the optical fiber cable 2 including the optical fiber cable connected that is used in the investigation and is comprises a case 3 formed in the shape of a box, an insertion hole 4 inserted the optical fiber cable thereinto and a drum 5 that winds the optical fiber cable 2.

The insertion hole 4 is formed at a central portion of an upper surface and both sidewalls of the case 3 so as to insert the optical fiber cable 2 thereinto so as to pass through inside the case 3.

The drum 5 is mounted rotatably so as to able to wind the optical fiber cable 2 so as to not spoil the characteristic of the optical fiber cable 2.

The case 3 further includes a lower case 6 and an upper case 10. The upper case 10 has upper case bodies 9, 9 divided by two bodies having same shape respectively, attaching fixedly on an upper surface of the lower case 6 by a plurality of screws, 6 pieces of screws in this embodiment, and having a space as an insertion hole 4 inserted the optical fiber cable positioned at an upward portion of the substantial central portion of the lower case 6 and an axle hole placed at the central portion thereof.

Figure 5:
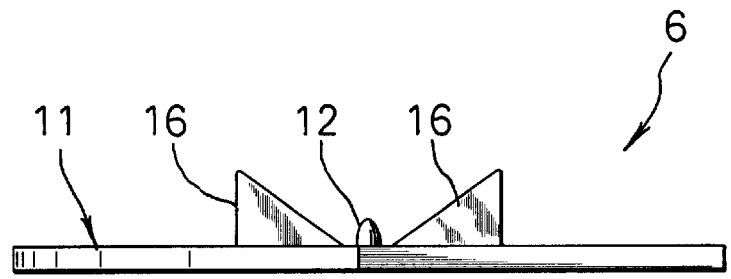
FIG. 5 is a top view of a lower case.
Figure 6:
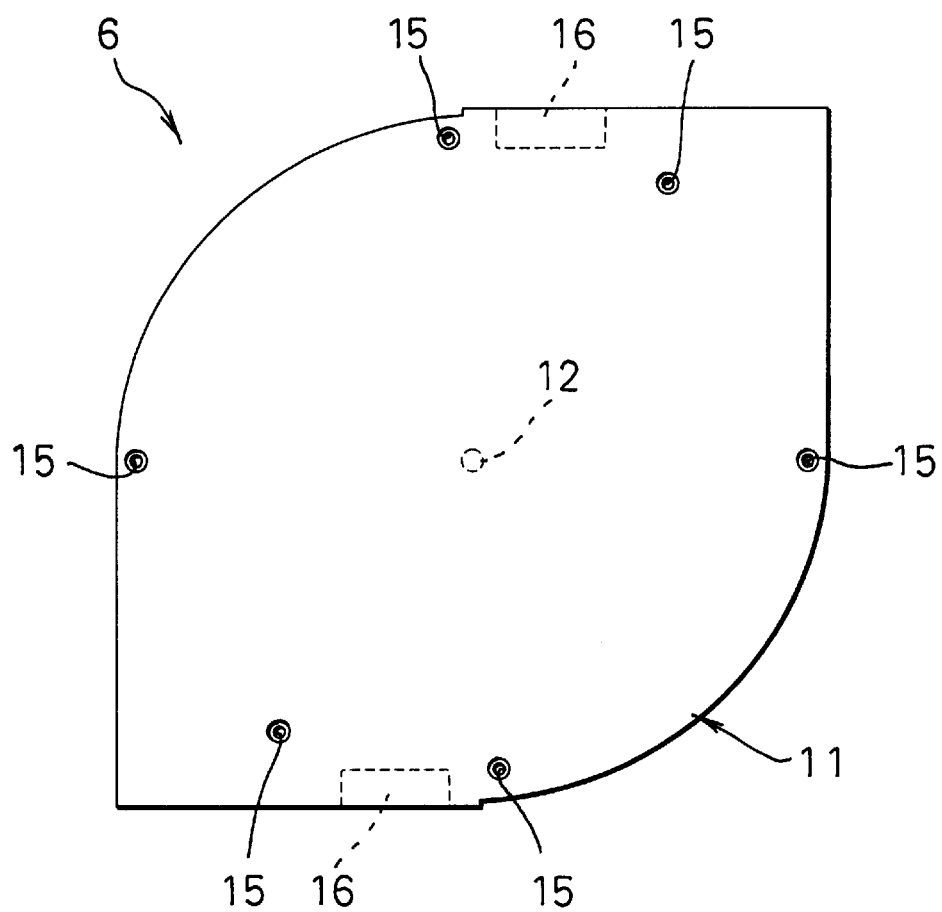
FIG. 6 is a front view of a lower case.
Figure 7:
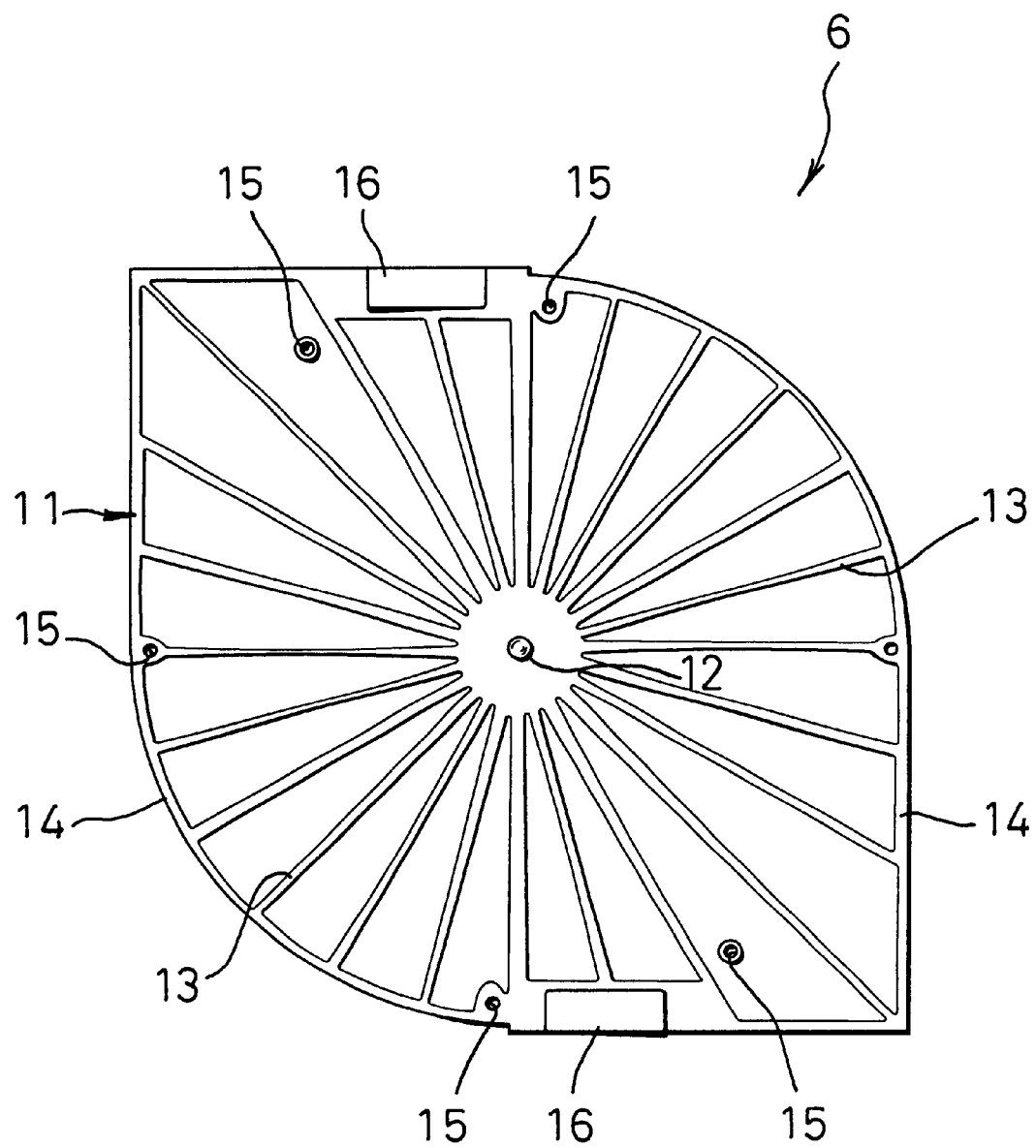
FIG. 7 is a bottom view of a lower case.
Figure 8:
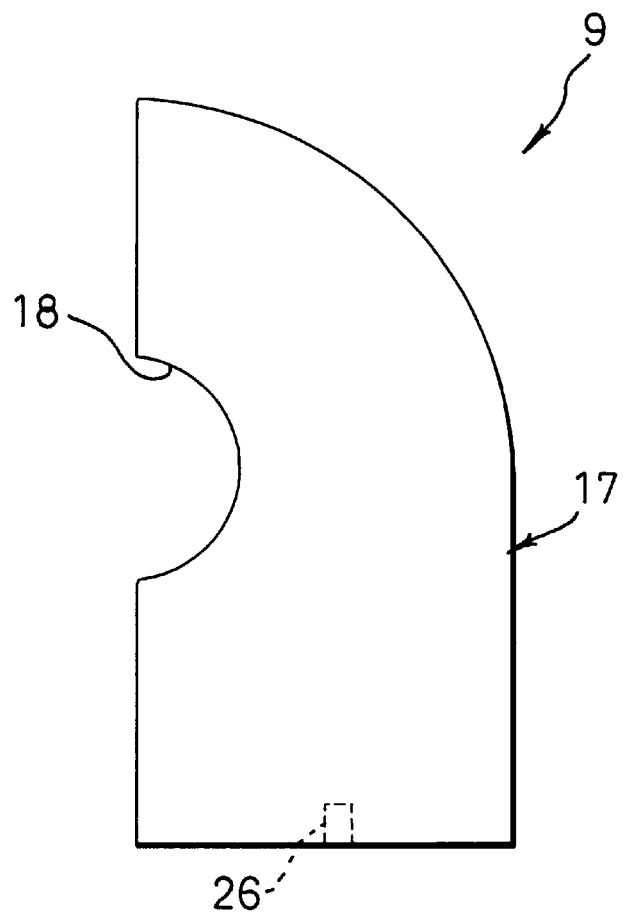
FIG. 8 is a top view of an upper case body.
Figure 9:
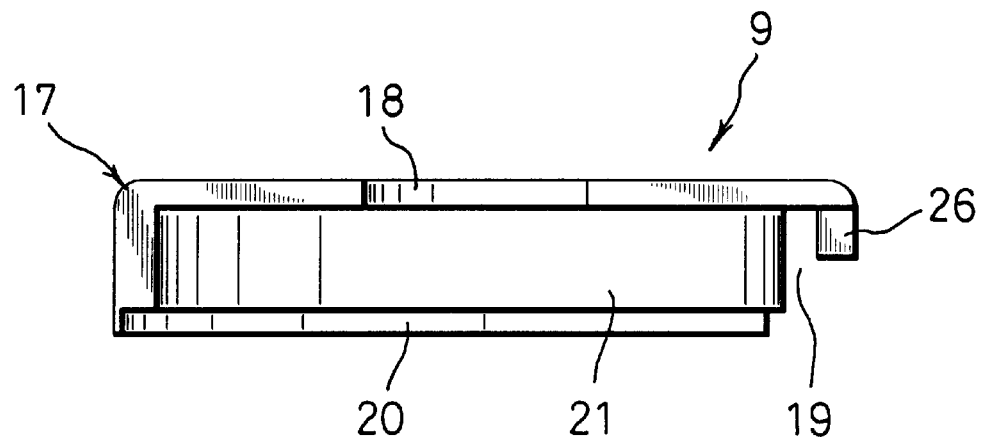
FIG. 9 is a left side view of an upper case body.
Figure 10:
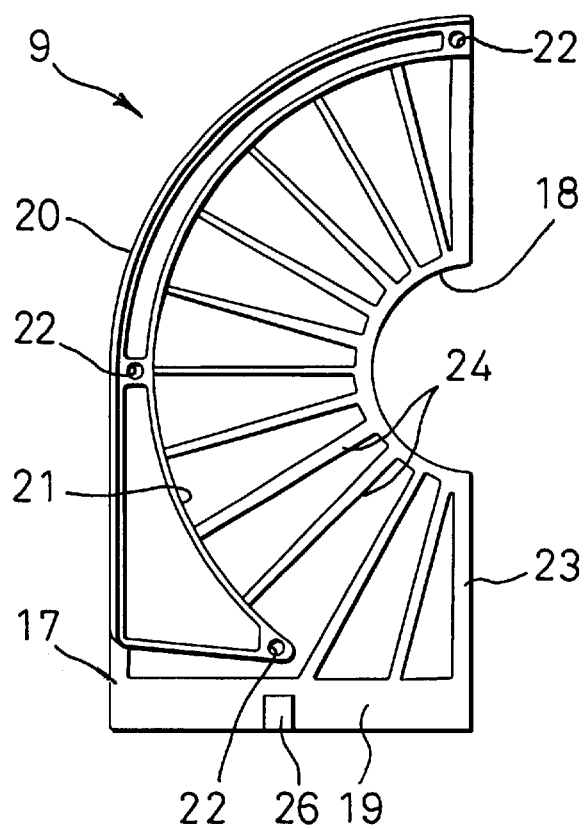
FIG. 10 is a bottom view of an upper case body showing the first embodiment of the present invention.
Figure 11:
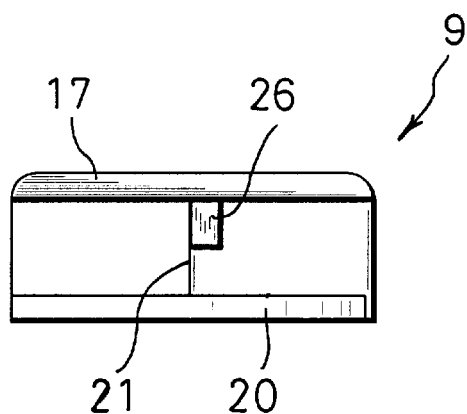
FIG. 11 is a front view of an upper case body showing the first embodiment of the present invention.
Figure 12:
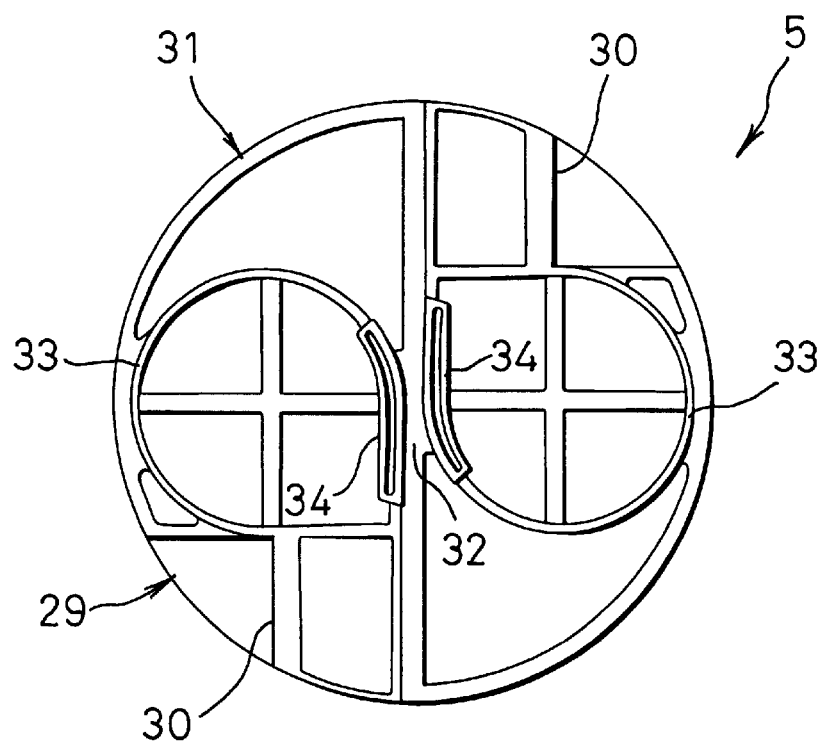
FIG. 12 is a top view of a drum for winding the optical fiber cable.
Figure 13:
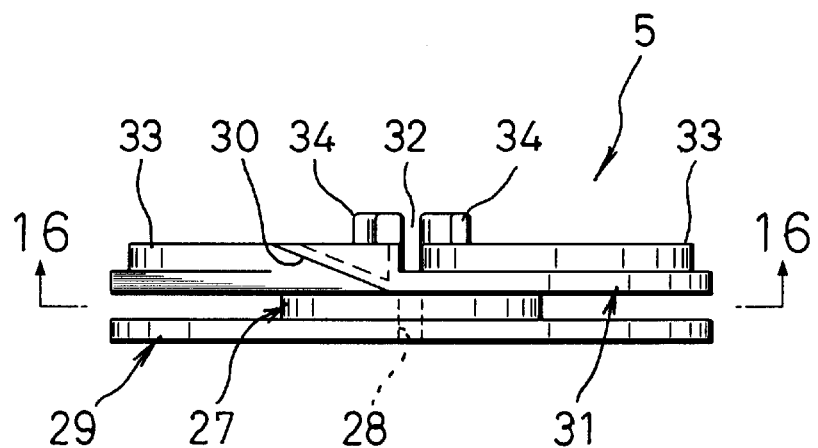
FIG. 13 is a front view of a drum for winding the optical fiber cable.
Figure 14:
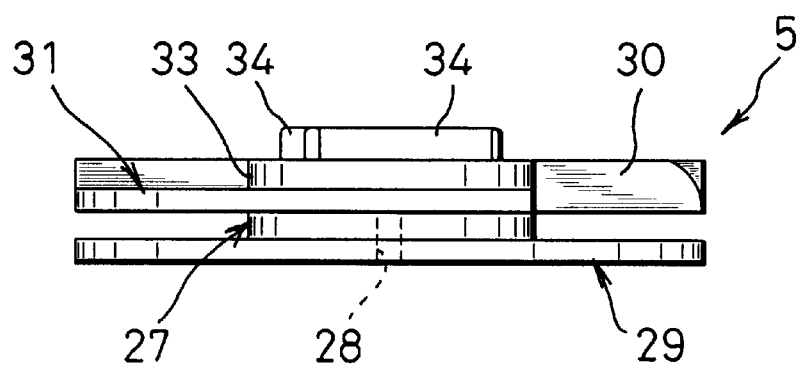
FIG. 14 is a side view of a drum for winding the optical fiber cable.
Figure 15:
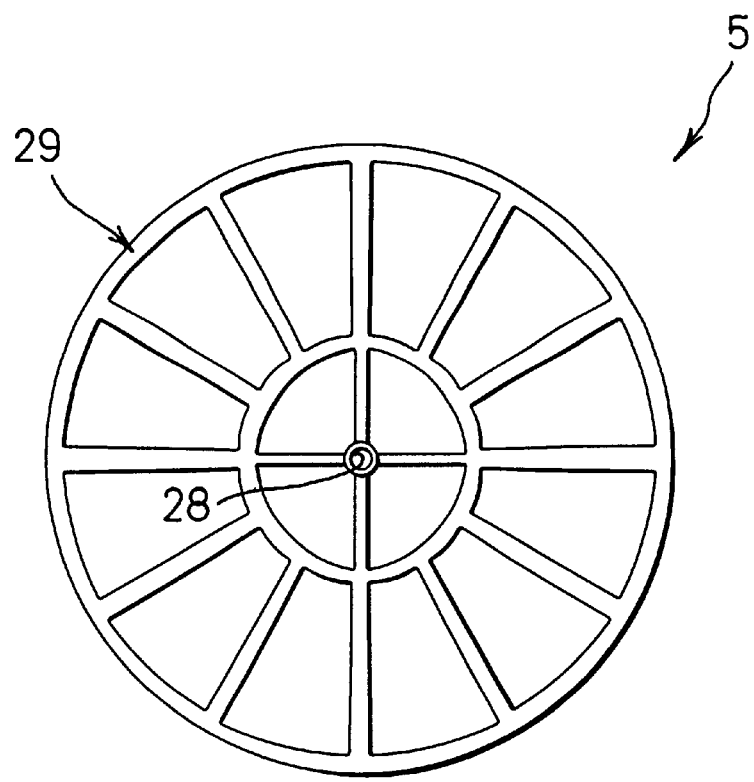
FIG. 15 is a bottom view of a drum for winding the optical fiber cable.
Figure 16:
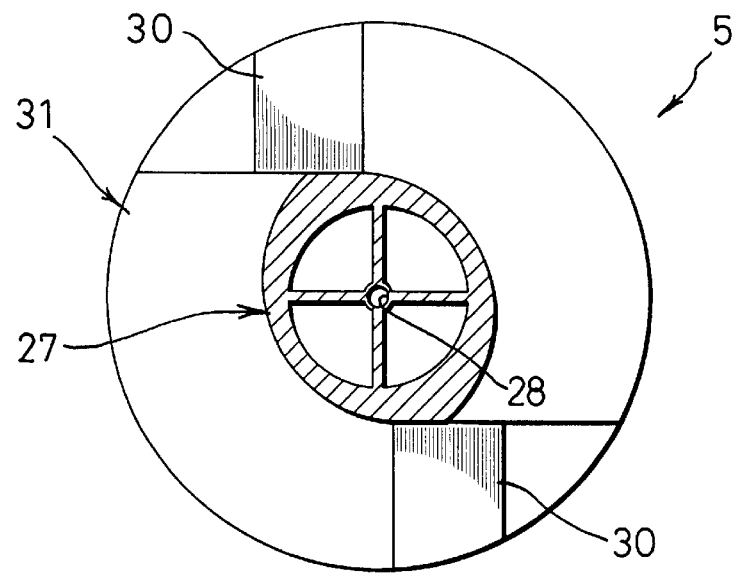
FIG. 16 is a cross sectional view taken a line 16—16 of FIG. 13.

As illustrated in FIGS. 5 to 7, the lower case 6 further includes a lower case body 11, a support axle 12, reinforcement ribs 13, 14 and a pair of engaging pieces 16, 16. The lower case body 11 is formed in the shape of a plate and an oval, having opposite portions at a right angle substantially respectively. The support axle 12 is formed integrally with the central portion of the upper surface of the lower case body 11 so as to protrude upwardly. The reinforcement ribs 13,14 are provided in the spoke-wise shape on the upper surface of the lower case body 11 corresponds to an outer circumferential portion of the support axle 12 and provided integrally at the outer circumferential portion of the upper surface of the lower case body 11. The six insertion holes 15 are formed at a portion adjacent the outer circumferential portion of the lower case body 11. The engage pieces 16, 16 are formed in the shape of a wedge and provided at the outer circumferential portion of the upper surface of the lower case body at the opposite position respectively.

As illustrated in FIGS. 8 to 11, the upper case body 9, 9 of the upper case further includes an upper board 17, a concave portion 18, a sidewall 20, an inner side wall 21, screwed holes 22, 22, 22, reinforcement rib 23, 24 and a guide piece 26. The upper board 17, having a plate-shape, is provided so as to divide it into two halves of the lower case 6. The concave portion 18 is formed in the shape of a semicircle, occupying the half of the axle hole 8, provided at the central portion of the inner surface of the upper board 17. The sidewall 20 is formed integrally at the circumferential portion of the lower surface without an opened end portion 19 of the upper board 17. The inner sidewall 21 is formed integrally at the lower surface of the upper board 17 inside of the sidewall 20. The screw holes 22 are provided at portions corresponds to the location of the insertion holes 15 on the upper board respectively. The reinforcement ribs 23, 24 are formed with an outer circumferential portion of the bottom surface of the upper board 17 without the attached portion of the sidewall 20 and an outer circumferential portion of the concave portion 18, forming in a radial shape. The guide piece 26 is attached integrally to the upper board 17 so as to locate through spaces 25, 25 back portion of the engage pieces 16, 16 of the lower case 6.

As illustrated in FIGS. 12 to 16, the drum 5 further includes a winding drum 27, a lower flange 29, a flange 31, a pair of guide drums 33, 33 and a pair of revolving bodies 34, 34. The winding drum 27 for winding of the optical fiber cable can be rolled round so that the characteristic of an optical fiber cable 2 may not be spoiled. The lower flange 29 is fixed to the lower portion of the winding drum 27 integrally or separately, having an insertion hole 28 inserted the support axle 12 of the case the central portion thereof. The flange 31 is fixed to the upper portion of the winding drum 27 or formed integrally thereto, having a guide 30 which introduces the optical fiber cable to the winding drum 27 located at 180 degrees. The guide drums 33, 33 are fixed or formed integrally to the upper surface of the lower flange 31 or formed integrally to lower flange 31 through a space 32 which is able to insert the optical fiber cable 2 thereinto. The knobs as a revolving body 34, 34 are formed integrally inside portion of the guide drums 33, 33 respectively, being inserted rotatably into the axle hole 8 of the case 3.

Figure 17:
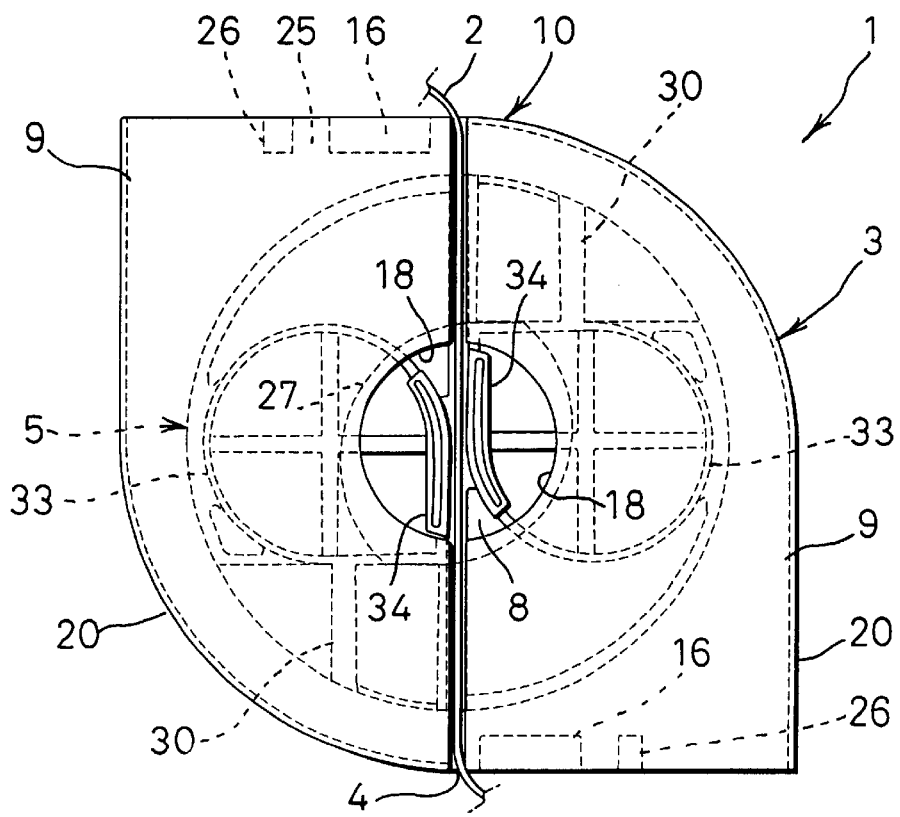
FIG. 17 is an explanation view showing the way in which the optical fiber cable is inserted.

As illustrated in FIG. 17, after the winding device 1 of the present invention allows the center portion of the wiring optical fiber cable 2 to locate in the insertion hole 4, the optical fiber cable 2 located into the insertion hole 4 passes through the engage pieces 16, 16 of the lower case 6 and guide piece 26, 26 of the upper case 10 and is allowed it to locate thereinto.

Figure 18:
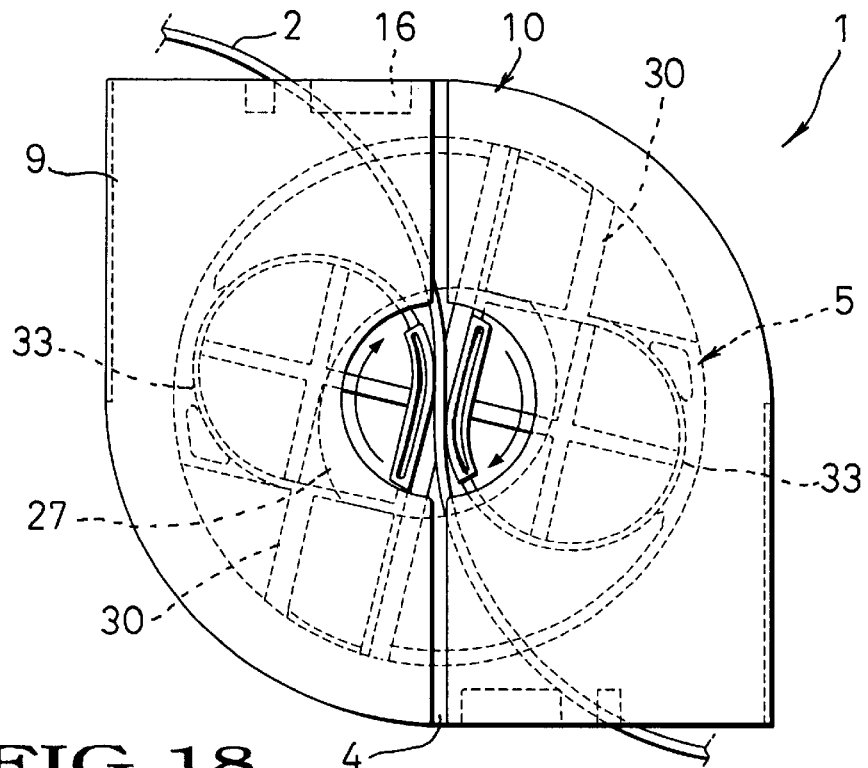
FIG. 18 is an explanation view showing the way in which the optical fiber cable is inserted and passes through along the engage piece.
Figure 19:
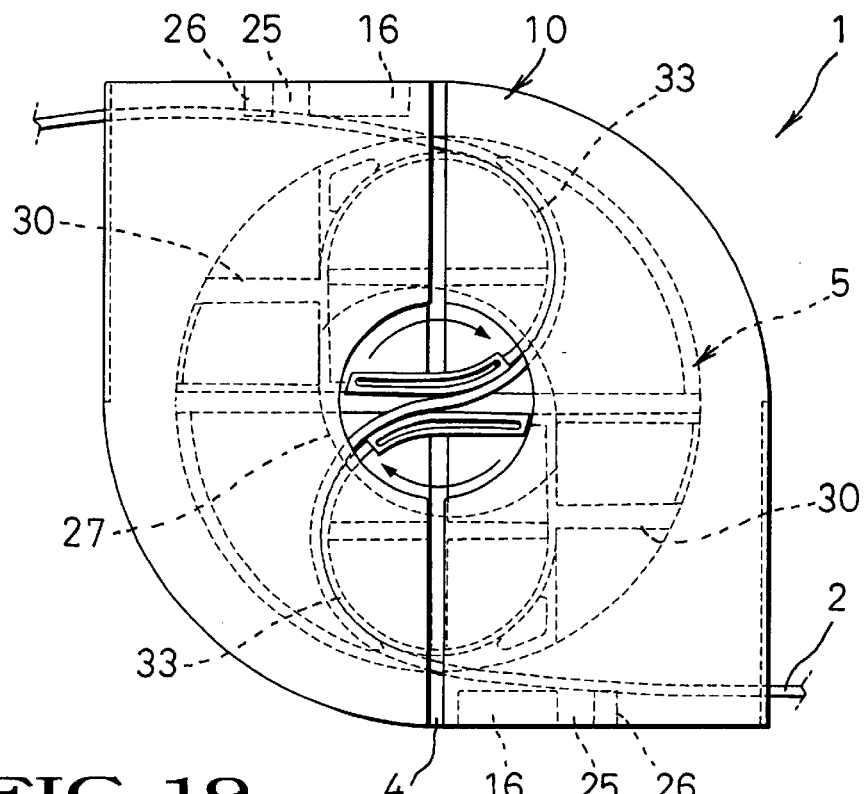
FIG. 19 is an explanation view showing the way in which the insertion of the optical fiber cable is done.
Figure 20:
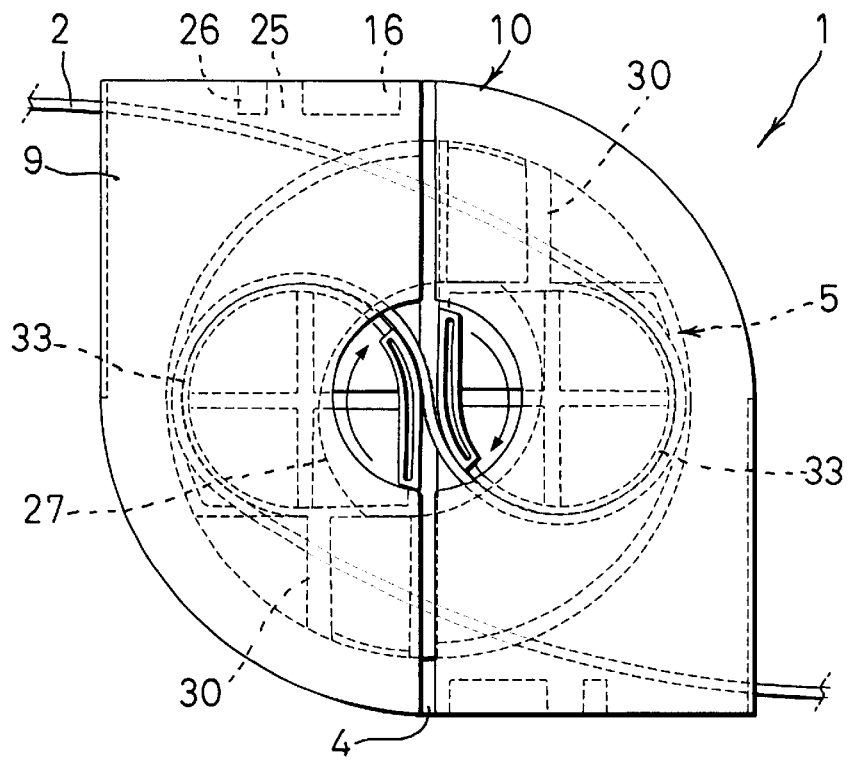
FIG. 20 is an explanation view showing the way in which the optical fiber cable is wound at the first stage.
Figure 21:
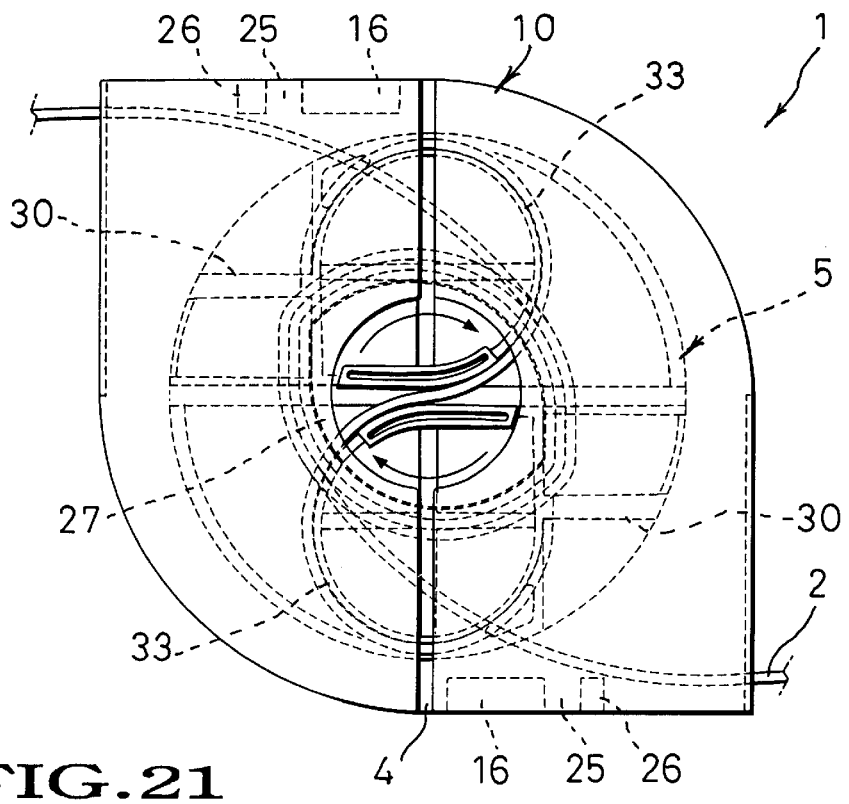
FIG. 21 is an explanation view showing the way in which the optical fiber cable is being wounded.

After that, by rotating the knobs 34, 34, the optical fiber cable 2 is inserted into the insertion hole 4 of the case 3 and inserted into the space 32 between the guide drums 33, 33. Then the optical fiber cable 2 is wound around the guide drums 33, 33 and introduced to the winding drum 27 from the guides 30, 30 when it rotates at 180 degrees. By the more rotation due to the knobs, as illustrated in FIG. 18, the optical fiber cable 2 is wound around the winding drum 27 and stored in it.

Other embodiments of the present invention will now be described referring to FIGS. 22 to 27. Through the drawings of the embodiments, like components are denoted by like numerals as of the first embodiment and will not be further explained in great detail.

Figure 22:
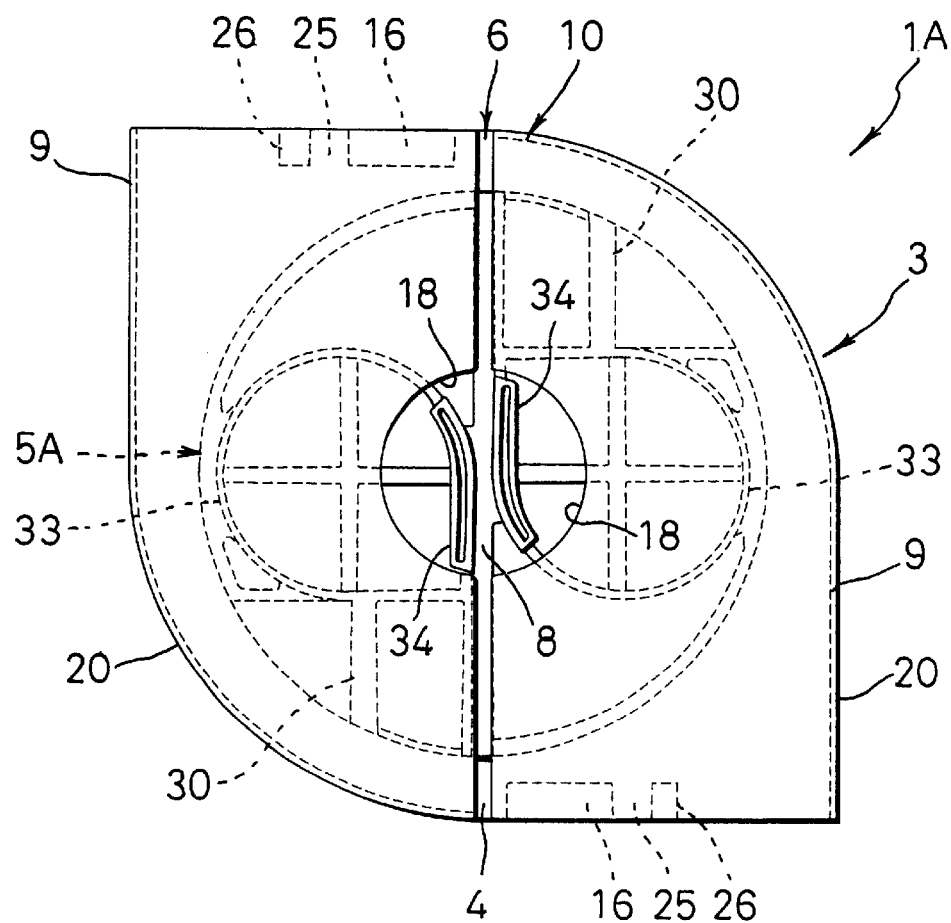
FIG. 22 is a top view showing a second embodiment of the present invention.
Figure 23:
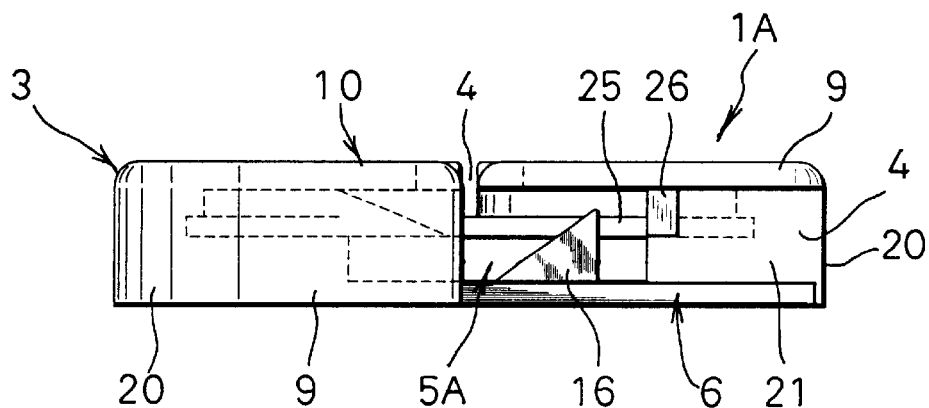
FIG. 23 is a front view showing the second embodiment of the present invention.
Figure 24:
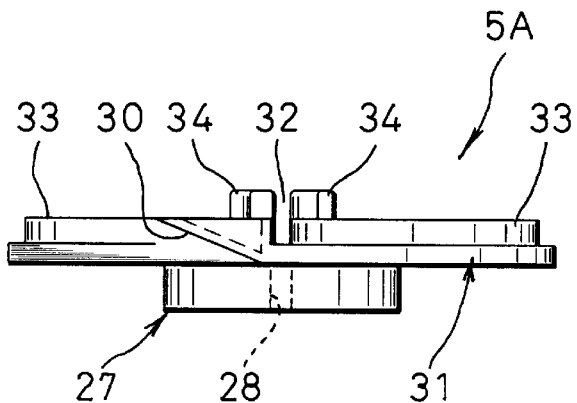
FIG. 24 is a front view of a drum for winding the optical fiber cable.

A second embodiment of the present invention is shown in FIGS. 22 to 24. It is distinguished from the first embodiment by the fact that the drum 5 is replaced with another drum 5A having the insertion hole 28 for the support axle provided at the center portion of the lower part of the winding drum 27 and without the lower flange. A winding device 1A with the drum 5A according to the second embodiment has similar advantages to that according to the first embodiment.

Figure 25:
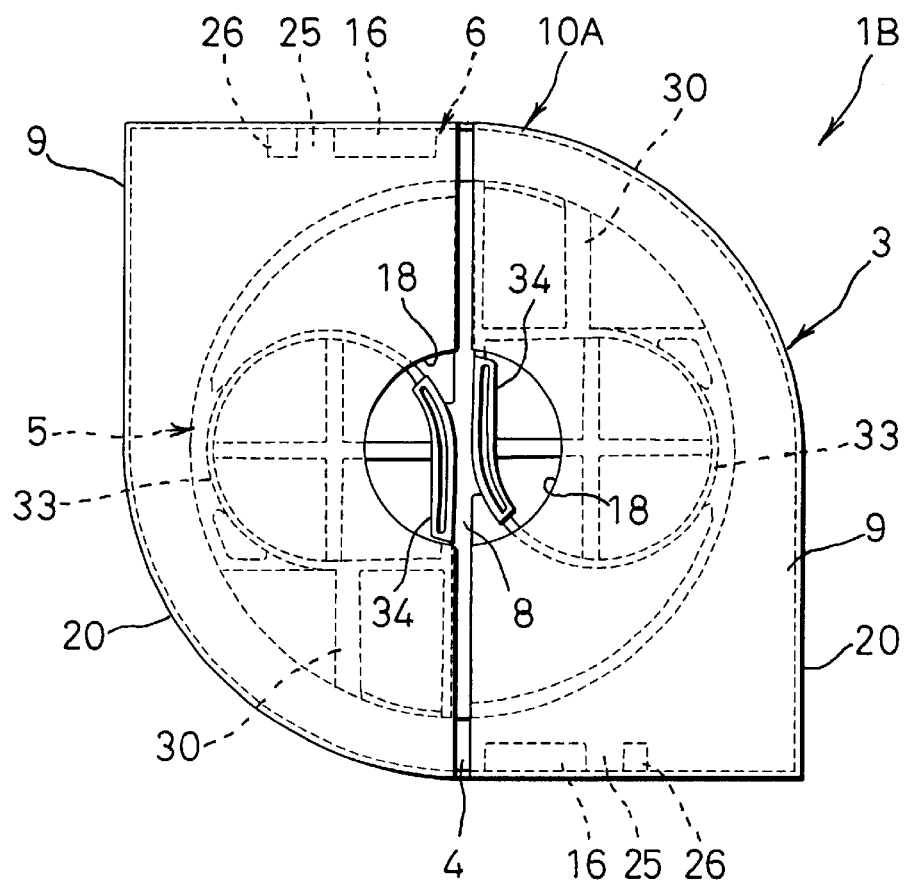
FIG. 25 is a top view showing a third embodiment of the present invention.
Figure 26:
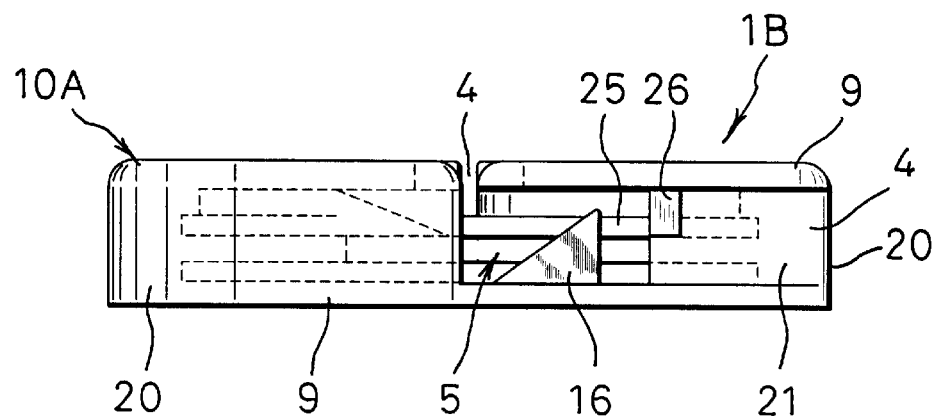
FIG. 26 is a front view showing the third embodiment of the present invention.
Figure 27:
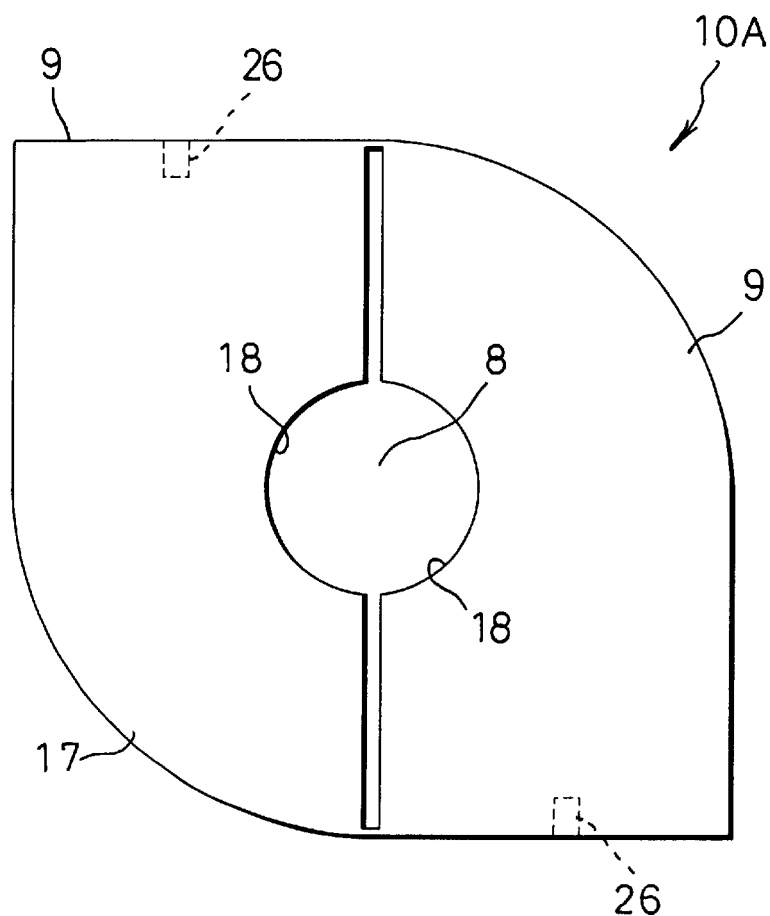
FIG. 27 is an explanation view of an upper case showing the third embodiment of the present invention.

A third embodiment of the present invention is shown in FIGS. 25 to 27. It is distinguished from the first embodiment by the fact that the upper case bodies 9, 9 are provided to the upper case 10 integrally. A winding device 1B with the upper case 10A according to the second embodiment has similar advantages to that according to the first embodiment.

As set forth above, the advantages of the invention are as follows:

(1) A device for winding an optical fiber cable comprises a case formed in the shape of a box, having an axle hole at a center portion of an upper surface thereof; an insertion hole provided substantially central portion of an upper surface and both of sidewalls so as to insert the optical fiber cable so that it pass through into the case; and a drum further including; a winding drum for winding the optical fiber cable provided rotatably into the case so that the optical fiber cable can be wound with bend in a condition that it is not harmed for the characteristic of the optical fiber cable, a flange one of formed integrally and fixed to an upper part of the winding drum, having a guide part that guides end portions of the optical fiber cable to the winding drum after the optical fiber cable is inserted into the insertion hole of the case; a pair of guide drums one of formed integrally and fixed to an upper part of the flange through the space, capable of inserting the optical fiber cable therein; and a rotation implement inserted rotatably into the axle hole formed inner portion of the guide drums, allowing to rotate from the outside the case. Accordingly, the remaining portion of the wired optical fiber cable and the connected optical cable used when in investigation can be wound with bent in a condition that it is not harmed for the characteristic of the optical fiber cable.

Therefore, while the wiring of the optical fiber cable can be performed comfortably without caring about the remaining portion, the wiring can be arranged finely. In addition, the connected optical cable used when in investigation can be used easily.

(2) As discussed above, since the optical fiber cable can be wound with bend in a condition that it is not harmed for the characteristic of the optical fiber cable only by rotating the drum, everyone can uses safely and easily.

(3) As discussed above, since the central part of the optical fiber cable can be wound only by inserting into the recess and rotating it, attachment is easy and can be done simply.

(4) As discussed above, the winding drum can wind the optical fiber cable that extends the right and leftward directions, so that the thickness of the case maybe thinned.

Therefore, it can be reduced its size.

What is claimed is:

1. A device for winding an optical fiber cable comprising:

a case formed in the shape of a box, having an axle hole at a center portion of an upper surface thereof;

an insertion hole provided substantially central portion of an upper surface and both of sidewalls so as to insert the optical fiber cable so that it pass through into the case; and a drum further including;
- a winding drum for winding the optical fiber cable provided rotatably into the case so that the optical fiber cable can be wound with bend in a condition that it is not harmed for the characteristic of the optical fiber cable;
- a flange one of formed integrally and fixed to an upper part of the winding drum, having a guide part that guides end portions of the optical fiber cable to the winding drum after the optical fiber cable is inserted into the insertion hole of the case;
- a pair of guide drums one of formed integrally and fixed to an upper part of the flange through the space, capable of inserting the optical fiber cable therein; and
- a rotation implement inserted rotatably into the axle hole formed inner portion of the guide drums, allowing to rotate from the outside the case.

2. A device for winding an optical fiber cable comprising:

a case formed in the shape of a box, having an axle hole at a center portion of an upper surface thereof, having a support axle provided at a center inner surface of a lower case;

an insertion hole provided substantially central portion of an upper surface and both of sidewalls so as to insert the optical fiber cable so that it pass through into the case; and a drum further including;
- a winding drum for winding the optical fiber cable provided rotatably into the case so that the optical fiber cable can be wound with bend in a condition that it is not harmed for the characteristic of the optical fiber cable, having an insertion hole for the support axle that allows the support axle to insert thereinto;
- a flange one of formed integrally and fixed to an upper part of the winding drum, having a guide part that guides end portions of the optical fiber cable to the winding drum after the optical fiber cable is inserted into the insertion hole of the case;
- a pair of guide drums one of formed integrally and fixed to an upper part of the flange through the space, capable of inserting the optical fiber cable therein; and
- a rotation implement inserted rotatably into the axle hole formed inner portion of the guide drums, allowing to rotate from the outside the case.

3. A device for winding in the optical fiber cable according to claim 1 or 2, wherein the case further includes a lower case body formed in the shape of an oval, having opposite portions at a right angle substantially respectively, and having a support axle provided at an inner surface of the center portion thereof; and an upper case body attached to the lower case body and provided so as to divide it into two halves, allowing the opposite portions of the lower case to locate at right and left sides respectively, having a space as an insertion hole inserted the optical fiber cable thereinto provided at inner portion thereof, an axle hole provided at a center portion thereof and a sidewall provided at a circumferential portion thereof without a portion of the right angle portion at the side adjacent the space as the insertion hole.

4. A device for winding in the optical fiber cable according to claim 1 or 2, wherein the drum further includes the winding drum capable of winding with bend that the characteristic of the optical fiber cable may not be spoiled; a lower flange one of fixed to a lower part of the winding drum and provided integrally therewith, having an insertion hole provided at a center portion thereof; a flange one of formed integrally and fixed to an upper part of the winding drum, having a guide part that guides end portions of the optical fiber cable to the winding drum after the optical fiber cable is inserted into the insertion hole of the case; and revolving body provided inside of the guide drum, allowing to enter into the axle hole of the case.

* * * * *